United States Patent
Xu et al.

(10) Patent No.: US 12,021,714 B2
(45) Date of Patent: Jun. 25, 2024

(54) NETWORK DEVICE CONTROL METHOD AND APPARATUS FOR COLLECTING AND DETERMINING DATA TRENDS

(71) Applicant: HUAWEI TECHNOLOGIES CO., LTD., Shenzhen (CN)

(72) Inventors: Xiaodong Xu, Beijing (CN); Wenjie Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/522,061

(22) Filed: Nov. 9, 2021

(65) Prior Publication Data

US 2022/0150146 A1 May 12, 2022

(30) Foreign Application Priority Data

Nov. 11, 2020 (CN) .................... 202011259308.X

(51) Int. Cl.
*H04L 43/08* (2022.01)
*H04L 41/14* (2022.01)
*H04L 41/147* (2022.01)

(52) U.S. Cl.
CPC ............ *H04L 43/08* (2013.01); *H04L 41/145* (2013.01); *H04L 41/147* (2013.01)

(58) Field of Classification Search
None
See application file for complete search history.

(56) References Cited

U.S. PATENT DOCUMENTS

| | | | |
|---|---|---|---|
| 4,215,412 A | 7/1980 | Bernier et al. | |
| 4,721,083 A | 1/1988 | Hosaka | |
| 11,419,247 B2* | 8/2022 | Egger | G06N 3/0445 |
| 2006/0002712 A1 | 1/2006 | Ekkizogloy et al. | |
| 2010/0211817 A1* | 8/2010 | Yang | H04L 41/147 |
| | | | 714/39 |
| 2010/0216407 A1 | 8/2010 | Gormley | |
| 2013/0179538 A1* | 7/2013 | Dutta | H04L 43/0817 |
| | | | 709/217 |
| 2013/0279918 A1* | 10/2013 | Mizutani | H04J 14/0278 |
| | | | 398/135 |
| 2015/0138989 A1* | 5/2015 | Polehn | H04W 24/02 |
| | | | 370/241 |
| 2017/0353516 A1* | 12/2017 | Gordon | H04L 65/80 |

(Continued)

FOREIGN PATENT DOCUMENTS

| | | |
|---|---|---|
| CN | 101099315 A | 1/2008 |
| CN | 101582011 A | 11/2009 |

(Continued)

*Primary Examiner* — Mohamed Ibrahim
(74) *Attorney, Agent, or Firm* — RIMON PC

(57) ABSTRACT

A network device control method and a control apparatus. The control apparatus may collect first working data, where the first working data includes a first measurement value, a first performance value, and a first device running parameter. The control apparatus determines whether the collected first working data meets a trend of a first set, where the trend of the first set is that an increasing/decreasing trend of measurement values in a plurality of groups of working data in the first set is consistent with or contrary to an increasing/decreasing trend of performance values in the plurality of groups of working data.

20 Claims, 6 Drawing Sheets

(56) References Cited

U.S. PATENT DOCUMENTS

| | | | |
|---|---|---|---|
| 2018/0176071 A1 | 6/2018 | Jabbar et al. | |
| 2018/0239851 A1 | 8/2018 | Ypma et al. | |
| 2020/0133257 A1* | 4/2020 | Cella | G05B 19/4183 |
| 2020/0220351 A1* | 7/2020 | Meagher | G06F 30/20 |
| 2021/0203576 A1* | 7/2021 | Padfield | H04L 41/16 |
| 2022/0091654 A1* | 3/2022 | Dai | G06F 1/206 |
| 2022/0148130 A1* | 5/2022 | Tang | G06N 3/0454 |

FOREIGN PATENT DOCUMENTS

| | | |
|---|---|---|
| CN | 105930225 A | 9/2016 |
| CN | 108491305 A | 9/2018 |

* cited by examiner

NETWORK DEVICE CONTROL METHOD AND APPARATUS FOR COLLECTING AND DETERMINING DATA TRENDS

CROSS-REFERENCE TO RELATED APPLICATIONS

This application claims priority to Chinese Patent Application No. 202011259308.X, filed on Nov. 11, 2020. The disclosure of the aforementioned application is hereby incorporated by reference in its entirety.

TECHNICAL FIELD

This application relates to the field of communications technologies, and in particular, to a network device control method and apparatus.

BACKGROUND

In a data transmission process, to enable a network device to perform transmission based on preset data transmission quality, the network device needs to perform adaptive learning on its running parameters based on the current working condition, and this adaptive learning process usually needs to take hundreds of milliseconds. As a result, the network device cannot be quickly started, which affects data transmission.

SUMMARY

Embodiments of this application provide a network device control method and apparatus, to solve the problem that a network device cannot be quickly started.

According to a first aspect of the embodiments of this application, a network device control method is provided. The method may include: collecting, by a control apparatus, first working data, where the first working data includes a first measurement value, a first performance value, and a first device running parameter, the first measurement value indicates a working condition corresponding to a network device in a working process, the first performance value indicates data transmission quality of the network device in the working condition indicated by the first measurement value, and the first device running parameter indicates a corresponding running parameter when the data transmission quality of the network device is the first performance value; determining, by the control apparatus, whether the first working data meets a trend of a first set, where the first set includes a plurality of groups of working data, and the increasing/decreasing trend of measurement values in the plurality of groups of working data is consistent with the increasing/decreasing trend of performance values in the plurality of groups of working data, or the increasing/decreasing trend of measurement values in the plurality of groups of working data is contrary to the increasing/decreasing trend of performance values in the plurality of groups of working data; adding, by the control apparatus, the first working data to the first set in response to that the first working data meets the trend of the first set; and determining, by the control apparatus, second working data based on a current measurement value, and controlling, based on a second device running parameter in the second working data, the network device to run, where the current measurement value indicates a working condition currently corresponding to the network device, the second working data includes a second measurement value, a second performance value, and the second device running parameter, and the first set includes the second working data or the second working data is associated with the first set.

In some embodiments, when the network device works normally, the control apparatus may collect the first working data in real time, and determine whether the first working data meets the trend of the first set. When the first working data meets the trend of the first set, the control apparatus adds the first working data to the first set, so that the first set can include working data corresponding to the network device in different working conditions. When the network device needs to be controlled to start running, the control apparatus may determine the matched second working data based on the current measurement value, and control, by using the second device running parameter in the second working data, the network device to run, so that not only the network device can be quickly started, but also the data transmission quality of the network device can be ensured.

In a possible implementation, the determining, by the control apparatus, whether the first working data meets a trend of a first set includes: obtaining, by the control apparatus, third working data from the first set, where the third working data includes a third measurement value, a third performance value, and a third device running parameter, and the difference between the first measurement value and the third measurement value is not greater than the difference between the first measurement value and any other measurement value in the first set; determining, by the control apparatus, whether the increasing/decreasing trend of the first measurement value relative to the third measurement value and the increasing/decreasing trend of the first performance value relative to the third performance value meet a preset change trend, where the preset change trend is a change consistency trend or a change contrary trend; and in response to that the increasing/decreasing trend of the first measurement value relative to the third measurement value and the increasing/decreasing trend of the first performance value relative to the third performance value meet the preset change trend, determining, by the control apparatus, that the first working data meets the trend of the first set. In this implementation, the control apparatus selects, from the first set, the third measurement value having the minimum difference with the first measurement value. When the change trend of the first measurement value relative to the third measurement value is consistent with or contrary to the change trend of the first performance value relative to the third performance value, the control apparatus determines that the first working data meets the first set, which indicates that the first working data is valid working data.

In a possible implementation, before the obtaining, by the control apparatus, third working data from the first set, the method includes: sorting, by the control apparatus, the plurality of groups of working data in the first set based on the measurement values in the plurality of groups of working data. In this implementation, to improve the working efficiency of the control apparatus, before selecting the third working data from the first set, the control apparatus may first sort the plurality of groups of working data in the first set based on the measurement values respectively corresponding to the plurality of groups of working data. The control apparatus selects the third working data from the sorted first set.

In a possible implementation, before the determining, by the control apparatus, second working data based on a current measurement value, the method further includes: obtaining, by the control apparatus, a second set based on the first set, where the second set is obtained from the first set through sampling based on a sampling parameter, and the second set includes the second working data. In this implementation, to further improve the working efficiency of the control apparatus, the control apparatus may extract some working data from the first set to generate the second set. When the network device needs to be controlled to start running, the control apparatus may select the matched working data from the second set to reduce searching workload.

In a possible implementation, the determining, by the control apparatus, second working data based on a current measurement value includes: searching, by the control apparatus, the first set or the second set for the matched second working data based on the current measurement value.

In a possible implementation, the determining, by the control apparatus, second working data based on a current measurement value includes: inputting, by the control apparatus, the current measurement value into a prediction model, where the prediction model is generated through training by using the first set or the second set, and the prediction model is used to predict, based on the current measurement value, the second working data that matches the current measurement value; and obtaining, by the control apparatus, the second working data that is output by the prediction model. In this implementation, after obtaining the first set or the second set, the control apparatus may generate the prediction model through training by using the first set or the second set. When a device running parameter of the network device needs to be controlled, the control apparatus may input the current measurement value into the prediction model as input data, to obtain the second working data that is output by the prediction model and that matches the current measurement value.

In a possible implementation, the method further includes: obtaining, by the control apparatus, fourth working data and fifth working data from the first set, where the fourth working data includes a fourth measurement value, a fourth performance value, and a fourth device running parameter, the fifth working data includes a fifth measurement value, a fifth performance value, and a fifth device running parameter, the fourth measurement value is the minimum measurement value in the first set, and the fifth measurement value is the maximum measurement value in the first set; determining, by the control apparatus, whether the difference between the fourth performance value and the fifth performance value is greater than a first preset threshold; and adjusting, by the control apparatus, the sampling parameter based on the difference in response to that the difference between the fourth performance value and the fifth performance value is greater than the first preset threshold. In this implementation, the control apparatus may alternatively adjust the sampling parameter based on the difference between the maximum performance value and the minimum performance value in the first set, to adjust the amount of working data included in the second set, thereby ensuring that the second set include diversified working data.

In a possible implementation, before the determining, by the control apparatus, whether the first working data meets a trend of a first set, the method includes: determining, by the control apparatus, whether the first performance value meets a second preset threshold; and in response to that the first performance value meets the second preset threshold, determining, by the control apparatus, whether the first working data meets the trend of the first set. In this implementation, considering that a performance value corresponding to the network device stably changes in a range when the network device normally works, to ensure the validity of the collected performance value, the control apparatus may further pre-determine whether the first performance value meets the second preset threshold. If the first performance value meets the second preset threshold, the control apparatus further determines whether the first working data meets the trend of the first set.

In a possible implementation, the determining, by the control apparatus, whether the first working data meets a trend of a first set includes: determining, by the control apparatus, whether the first performance value meets a second preset threshold; and in response to that the first performance value meets the second preset threshold, determining, by the control apparatus, whether the first working data meets the trend of the first set. In this implementation, the control apparatus directly compares the first performance value in the first working data with the second preset threshold. If the first performance value meets the second preset threshold, it indicates that the first working data is valid data, and the control apparatus adds the first working data to the first set.

In a possible implementation, the method further includes: determining, by the control apparatus, whether a change value of a junction temperature of the network device in preset duration exceeds a third preset threshold, where the junction temperature is a measurement value; and in response to that the change value of the junction temperature in the preset duration exceeds the third preset threshold, obtaining, by the control apparatus, sixth working data based on a current junction temperature of the network device, and controlling, by using a sixth device running parameter in the sixth working data, the network device to run, where the sixth working data includes a sixth measurement value, a sixth performance value, and the sixth device running parameter, the sixth measurement value includes the junction temperature, and the first set includes the sixth working data or the sixth working data is associated with the first set. In this implementation, to avoid a quick change of chip junction temperature, which causes unstable running of the network device, the control apparatus may further determine, in real time, whether the change value of the junction temperature in the preset duration exceeds the third preset threshold. If the change value exceeds the third preset threshold, the control apparatus obtains the matched sixth working data based on the current junction temperature, to control, by using the sixth device running parameter in the sixth working data, the network device to run, thereby ensuring running stability of the network device.

In a possible implementation, the method further includes: controlling, by the control apparatus, a heat dissipation device to run in a first working mode, where a heat dissipation efficiency of the heat dissipation device in the first working mode is greater than the preset heat dissipation efficiency.

In a possible implementation, before the determining, by the control apparatus, whether the first working data meets a trend of a first set, the method further includes: determining, by the control apparatus, whether a device parameter of the network device is consistent with a device parameter corresponding to the first set; and obtaining, by the control apparatus, a third set in response to that the device parameter of the network device is inconsistent with the device parameter corresponding to the first set, where the third set includes the first working data.

In a possible implementation, when the network device includes at least two groups of transceivers, each of the at least two groups of transceivers includes a plurality of transceivers, and each transceiver in the at least two groups of transceivers is in a low power consumption state, the method further includes: determining, by the control apparatus, whether to start the transceiver; in response to starting the transceiver, obtaining, by the control apparatus, a current measurement value, and determining seventh working data based on the current measurement value, where the seventh working data includes a seventh measurement value, a seventh performance value, and a seventh device running parameter, and the first set includes the seventh working data or the seventh working data is associated with the first set; separately sending, by the control apparatus, a startup signal to the at least two groups of transceivers at a first moment, where the startup signal includes the seventh working data, and the startup signal is used to indicate to start running a first preset quantity of transceivers in the low power consumption state in each group of transceivers based on the seventh device running parameter; and separately sending, by the control apparatus, the startup signal to the at least two groups of transceivers at a second moment, to indicate to start running a second preset quantity of transceivers in the low power consumption state in each group of transceivers based on the seventh device running parameter.

In a possible implementation, the determining, by the control apparatus, whether to start the transceiver includes:
  obtaining, by the control apparatus, a traffic load of a current network system and/or a working mode of the transceiver, where the working mode includes an active mode and a standby mode; and when the traffic load exceeds a preset traffic threshold and/or the transceiver is converted from the standby mode to the active mode, determining, by the control apparatus, to start the transceiver.

In a possible implementation, the measurement value is one or more of an ambient temperature, a junction temperature, or a working voltage.

In a possible implementation, the performance value includes a bit error rate and/or a signal-to-noise ratio.

In a possible implementation, the device running parameter includes chromatic dispersion compensation and/or polarization mode compensation.

According to a second aspect of the embodiments of this application, a network device control apparatus is provided. The apparatus includes: a collection unit, configured to collect first working data, where the first working data includes a first measurement value, a first performance value, and a first device running parameter, the first measurement value indicates a working condition corresponding to a network device in a working process, the first performance value indicates data transmission quality of the network device in the working condition indicated by the first measurement value, and the first device running parameter indicates a corresponding running parameter when data transmission quality of the network device is the first performance value; a determining unit, configured to determine whether the first working data meets a trend of a first set, where the first set includes a plurality of groups of working data, and the increasing/decreasing trend of measurement values in the plurality of groups of working data is consistent with the increasing/decreasing trend of performance values in the plurality of groups of working data, or the increasing/decreasing trend of measurement values in the plurality of groups of working data is contrary to the increasing/decreasing trend of performance values in the plurality of groups of working data; an addition unit, configured to add the first working data to the first set in response to that the first working data meets the trend of the first set, where the determining unit is further configured to determine second working data based on a current measurement value; and a control unit, configured to control, based on a second device running parameter in the second working data, the network device to run, where the current measurement value indicates a working condition currently corresponding to the network device, the second working data includes a second measurement value, a second performance value, and the second device running parameter, and the first set includes the second working data or the second working data is associated with the first set.

In a possible implementation, the determining unit is configured to: obtain third working data from the first set, where the third working data includes a third measurement value, a third performance value, and a third device running parameter, and the difference between the first measurement value and the third measurement value is not greater than the difference between the first measurement value and any other measurement value in the first set; determine whether an increasing/decreasing trend of the first measurement value relative to the third measurement value and an increasing/decreasing trend of the first performance value relative to the third performance value meet a preset change trend, where the preset change trend is a change consistency trend or a change contrary trend; and in response to that the increasing/decreasing trend of the first measurement value relative to the third measurement value and the increasing/decreasing trend of the first performance value relative to the third performance value meet the preset change trend, determine that the first working data meets the trend of the first set.

In a possible implementation, the determining unit is configured to sort the plurality of groups of working data in the first set based on the measurement values in the plurality of groups of working data.

In a possible implementation, the apparatus further includes: an obtaining unit, configured to obtain a second set based on the first set before the determining unit determines the second working data based on the current measurement value, where the second set is obtained from the first set through sampling based on a sampling parameter, and the second set includes the second working data.

In a possible implementation, the determining unit is configured to search the first set or the second set for the matched second working data based on the current measurement value.

In a possible implementation, the determining unit is configured to: input the current measurement value into a prediction model, where the prediction model is generated through training by using the first set or the second set, and the prediction model is used to predict, based on the current measurement value, the second working data that matches the current measurement value; and obtain the second working data that is output by the prediction model.

In a possible implementation, the apparatus further includes: an obtaining unit, configured to obtain fourth working data and fifth working data from the first set, where the fourth working data includes a fourth measurement value, a fourth performance value, and a fourth device running parameter, the fifth working data includes a fifth measurement value, a fifth performance value, and a fifth device running parameter, the fourth measurement value is the minimum measurement value in the first set, and the fifth measurement value is the maximum measurement value in the first set, where the determining unit is further configured to determine whether the difference between the fourth performance value and the fifth performance value is greater than a first preset threshold; and an adjustment unit, further configured to adjust the sampling parameter based on the difference in response to that the difference between the fourth performance value and the fifth performance value is greater than the first preset threshold.

In a possible implementation, the determining unit is further configured to: before determining whether the first working data meets the trend of the first set, determine whether the first performance value meets a second preset threshold; and in response to that the first performance value meets the second preset threshold, determine whether the first working data meets the trend of the first set.

In a possible implementation, the determining unit is further configured to: determine whether a change value of a junction temperature of the network device in preset duration exceeds a third preset threshold, where the junction temperature is a measurement value; and in response to that the change value of the junction temperature in the preset duration exceeds the third preset threshold, obtain sixth working data based on a current junction temperature of the network device, and control, by using a sixth device running parameter in the sixth working data, the network device to run, where the sixth working data includes a sixth measurement value, a sixth performance value, and the sixth device running parameter, the sixth measurement value includes the junction temperature, and the first set includes the sixth working data or the sixth working data is associated with the first set.

In a possible implementation, the apparatus further includes:
controlling, by the control apparatus, a heat dissipation device to run in a first working mode, where a heat dissipation efficiency of the heat dissipation device in the first working mode is greater than the preset heat dissipation efficiency.

In a possible implementation, the determining unit is further configured to: before determining whether the first working data meets the trend of the first set, determine whether a device parameter of the network device is consistent with a device parameter corresponding to the first set; and obtain a third set in response to that the device parameter of the network device is inconsistent with the device parameter corresponding to the first set, where the third set includes the first working data.

In a possible implementation, when the network device includes at least two groups of transceivers, each of the at least two groups of transceivers includes a plurality of transceivers, and each transceiver in the at least two groups of transceivers is in a low power consumption state, the apparatus further includes a sending unit; the determining unit is further configured to: determine whether to start the transceiver; and in response to starting the transceiver, obtain a current measurement value, and determine seventh working data based on the current measurement value, where the seventh working data includes a seventh measurement value, a seventh performance value, and a seventh device running parameter, and the first set includes the seventh working data or the seventh working data is associated with the first set; the sending unit is configured to separately send a startup signal to the at least two groups of transceivers at a first moment, where the startup signal includes the seventh working data, and the startup signal is used to indicate to start running a first preset quantity of transceivers in the low power consumption state in each group of transceivers based on the seventh device running parameter; and the sending unit is configured to separately send the startup signal to the at least two groups of transceivers at a second moment, to indicate to start running a second preset quantity of transceivers in the low power consumption state in each group of transceivers based on the seventh device running parameter. In this implementation, to avoid relatively large power ripple noise generated when all transceivers are started, when determining that the transceiver needs to be started, the control apparatus may start a preset quantity of transceivers in each of different groups at a same moment, and then start other transceivers in different groups at a next moment. In other words, transceivers in different groups may be started in parallel at a same moment, and transceivers started at different moments are started in serial.

In a possible implementation, the determining unit is further configured to: obtain a traffic load of a current network system and/or a working mode of the transceiver, where the working mode includes an active mode and a standby mode; and when the traffic load exceeds a preset traffic threshold and/or the transceiver is converted from the standby mode to the active mode, determine to start the transceiver.

In a possible implementation, the measurement value is one or more of an ambient temperature, a junction temperature, or a working voltage.

In a possible implementation, the performance value includes a bit error rate and/or a signal-to-noise ratio.

In a possible implementation, the device running parameter includes chromatic dispersion compensation and/or polarization mode compensation.

According to a third aspect of the embodiments of this application, a communications device is provided, and the device includes a processor and a memory.

The memory is configured to store instructions or a computer program.

The processor is configured to execute the instructions or the computer program in the memory, so that the communications device performs the method according to the first aspect.

According to a fourth aspect of the embodiments of this application, a computer-readable storage medium is provided, including instructions. When the instructions are run on a computer, the computer is enabled to perform the method according to the first aspect.

According to the technical solutions provided in the embodiments of this application, when the network device normally works, the control apparatus may collect the first working data of the network device. The first working data includes the first measurement value, the first performance value, and the first device running parameter. The first measurement value indicates the working condition corresponding to the network device in the working process, the first performance value indicates data transmission quality of the network device in the working condition indicated by the first measurement value, and the first device running parameter indicates the corresponding running parameter when data transmission quality of the network device is the first performance value. The control apparatus determines whether the collected first working data meets the trend of the first set. The trend of the first set is that the increasing/decreasing trend of the measurement values in the plurality of groups of working data in the first set is consistent with or contrary to the increasing/decreasing trend of the performance values in the plurality of groups of working data. When the first working data meets the trend of the first set, it indicates that the first working data is valid working data, the control apparatus adds the first working data to the first set, to obtain device running parameters corresponding to the network device in different working conditions. When the network device needs to be controlled to restart, or to enable transmission quality of the network device to reach preset quality, the control apparatus may determine the second working data based on the current measurement value and the first set, where the first set includes the second working data or the second working data is associated with the first set; and control, by using the second device running parameter in the second working data, the network device to run, so that the network device does not need to perform adaptive learning, thereby quickly starting the network device.

BRIEF DESCRIPTION OF DRAWINGS

To describe technical solutions in embodiments of this application or in the conventional technology more clearly, the following briefly describes accompanying drawings used in describing the embodiments or the conventional technology. It is clearly that, the accompanying drawings in the following description merely show some embodiments of this application, and persons of ordinary skill in the art may still derive other accompanying drawings from these accompanying drawings without creative efforts.

DESCRIPTION OF EMBODIMENTS

To make persons skilled in the art understand solutions in the present application better, the following clearly describes the technical solutions in embodiments of the present application with reference to accompanying drawings in the embodiments of the present application. It is clearly that, the described embodiments are merely some rather than all of the embodiments of the present application.

To facilitate understanding of the technical solutions provided in the embodiments of this application, network elements and technical names in the embodiments of this application are first described below.

A transceiver is located inside a network device and is configured to receive and send data, and may include a receiver and a transmitter. Specifically, the transceiver may be any existing device that has a receiving and sending function. For example, the transceiver may be a serializer/deserializer (Serdes). A key to stable working of the transceiver is whether a running parameter of the transceiver matches a hardware parameter and a working condition of the transceiver. For a given transceiver, a change of a running parameter of the transceiver is mainly affected by working conditions such as an ambient temperature and a chip junction temperature. To ensure data transmission quality, the network device usually needs to perform adaptive learning on the running parameter, so that a learned running parameter can match a current working condition.

A chip junction temperature is an actual working temperature of a semiconductor in the network device. In operation, the chip junction temperature is usually higher than an encapsulation case temperature.

It should be noted that a control apparatus in the embodiments of this application may be a device independent of the network device, or the control apparatus may be a component that has a control function in the network device.

Based on the foregoing description, a network device control method provided in embodiments of this application is described below with reference to the accompanying drawings.

Figure 1:
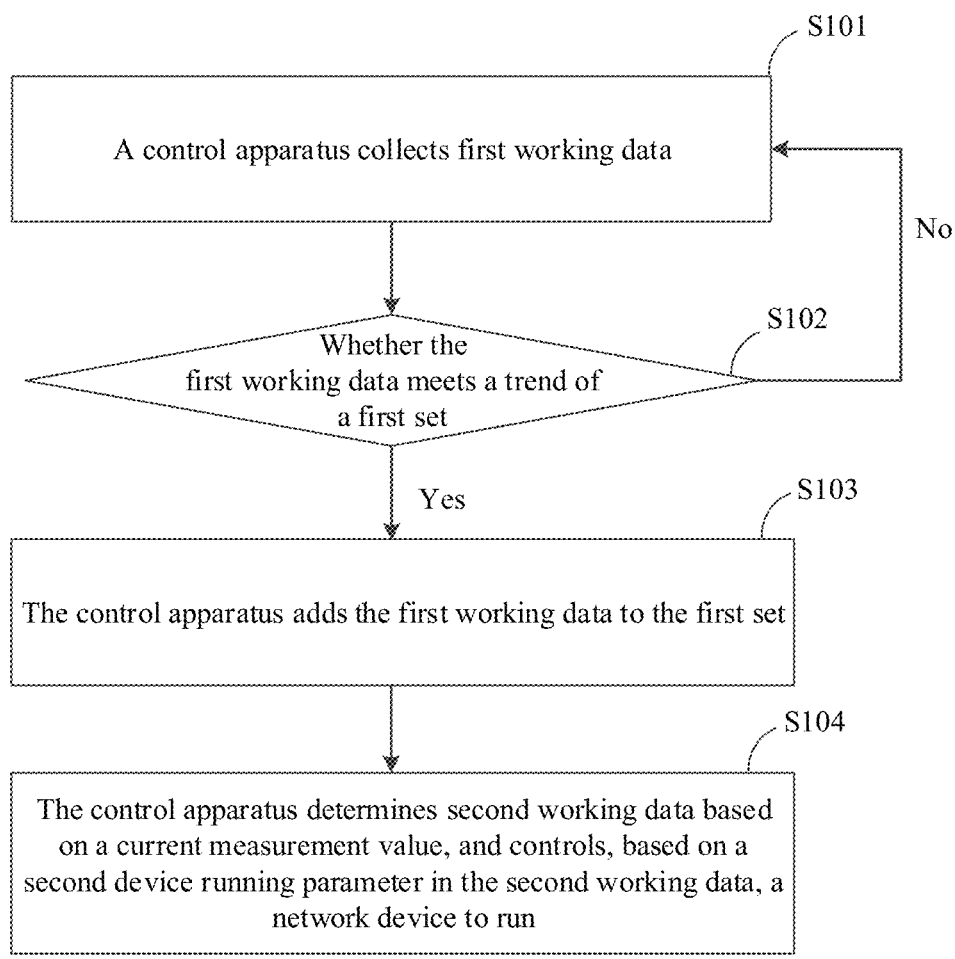
FIG. 1 is a flowchart of a network device control method according to an embodiment of this application.

FIG. 1 is a flowchart of a network device control method according to an embodiment of this application. As shown in FIG. 1, the method may include the following steps.

S101. A control apparatus collects first working data.

In some embodiments, in a normal running process of a network device, the control apparatus may collect the first working data corresponding to the network device in a current working condition. The first working data includes a first measurement value, a first performance value, and a first device running parameter. The first measurement value indicates a working condition corresponding to the network device in a working process. The working condition may include an ambient temperature, a chip junction temperature, a chip voltage, and the like. The first performance value indicates data transmission quality of the network device in the working condition indicated by the first measurement value. Indicators reflecting data transmission quality may include a bit error rate, a signal-to-noise ratio, and the like. The bit error rate is an indicator that measures data transmission accuracy of data in a specified time, and the bit error rate=a bit error in transmission/total quantity of transmitted bits*100%. The signal-to-noise ratio is a ratio of a signal to noise in a network device. The signal is an electronic signal that comes from the outside of the network device and that needs to be processed by the network device. The noise is an irregular extra signal (or information) that is generated after the electronic signal passes through the network device and that does not exist in the original signal, and the signal does not change with the original signal. The device running parameter indicates a corresponding running parameter when data transmission quality of the network device is the first performance value. The running parameter may include parameters corresponding to components in a transceiver, such as a compensation parameter, chromatic dispersion (CD) compensation, polarization mode dispersion (PMD) compensation, and a clock phase calibration parameter that are of an analog to digital converter (ADC) in the transceiver.

Specifically, the control apparatus may collect, based on a preset collection period, working data corresponding to the network device, to obtain working data corresponding to the network device in different working conditions, so as to cover a large quantity of working scenarios.

S102. The control apparatus determines whether the first working data meets a trend of a first set.

After collecting the first working data, the control apparatus determines whether the first working data meets a change trend of a plurality of groups of working data in the first set. The change trend means that an increasing/decreasing trend of measurement values in the plurality of groups of working data in the first set is consistent with an increasing/decreasing trend of performance values in the plurality of groups of working data. For example, when the measurement value in the plurality of groups of working data in the first set is in an increasing trend, the performance value in the plurality of groups of working data in the first set is also in an increasing trend. When the measurement value in the plurality of groups of working data in the first set is in a decreasing trend, the performance value in the plurality of groups of working data in the first set is also in a decreasing trend. For example, the measurement value is an ambient temperature, the performance value is a bit error rate, and the bit error rate in the plurality of groups of working data in the first set increases with an increase in the ambient temperature in the plurality of groups of working data. Alternatively, the change trend means that an increasing/decreasing trend of measurement values in the plurality of groups of working data in the first set is contrary to an increasing/decreasing trend of performance values in the plurality of groups of working data. For example, the measurement value is an ambient temperature, the performance value is a signal-to-noise ratio, and the signal-to-noise ratio in the plurality of groups of working data in the first set decreases with an increase in the ambient temperature in the plurality of groups of working data. Obtaining of the first set is described in a subsequent embodiment.

The control apparatus may determine, in the following manner, whether the first working data meets the trend of the first set. Details are as follows:

(1) The control apparatus obtains third working data from the first set, where the third working data includes a third measurement value, a third performance value, and a third device running parameter.

The difference between the first measurement value and the third measurement value is not greater than the difference between the first measurement value and any other measurement value in the first set. In other words, the difference between the first measurement value and the third measurement value is minimum. For example, if the measurement value is an ambient temperature, the first measurement value is 14.9°, and the first set includes three groups of working data, and ambient temperatures respectively corresponding to the three groups of working data are 15°, 15.6°, and 17°. In this case, the difference between 14.9° and 15° is minimum, and working data corresponding to 15° is the third working data.

Specifically, when selecting the third working data from the first set, the control apparatus traverses the working data in the first set, and finds the third working data in a traversing manner. To help the control apparatus quickly obtains the third working data through traversing, before performing traversing, the control apparatus may first sort the plurality of groups of working data in the first set based on the measurement values in the plurality of groups of working data, to obtain the sorted first set. The control apparatus obtains the third working data from the sorted first set. In this way, a searching speed of the control apparatus is improved.

(2) The control apparatus determines whether an increasing/decreasing trend of the first measurement value relative to the third measurement value and an increasing/decreasing trend of the first performance value relative to the third performance value meet a preset change trend.

Through the foregoing operations, the first set includes two change trends. One is that the increasing/decreasing trend of the measurement values in the plurality of groups of working data is consistent with the increasing/decreasing trend of the performance values in the plurality of groups of working data. In a specific range, the performance value increases with an increase in the measurement value, or the performance value decreases with a decrease in the measurement value. For example, a bit error rate increases with an increase in ambient temperature, and the bit error rate decreases with a decrease in the ambient temperature. The other one is that the increasing/decreasing trend of the measurement values in the plurality of groups of working data is contrary to the increasing/decreasing trend of the performance values in the plurality of groups of working data. In a specific range, the performance value decreases with an increase in the measurement value, or the performance value increases with a decrease in the measurement value. For example, a signal-to-noise ratio decreases with an increase in an ambient temperature, and the signal-to-noise ratio increases with a decrease in the ambient temperature. In other words, the preset change trend includes a change consistency trend and a change contrary trend.

It should be noted that when the measurement value includes a plurality of measurement indicators, such as an ambient temperature, a chip junction temperature, and a chip voltage, and the performance value includes a plurality of performance indicators, such as a bit error rate and a signal-to-noise ratio, there is a change trend difference between different measurement indicators and different performance indicators. When it is determined whether the first working data meets the trend of the first set, a corresponding preset change trend may be further determined based on a compared measurement indicator and performance indicator, so as to determine, based on the preset change trend, whether the first working data meets the trend of the first set.

(3) In response to that the increasing/decreasing trend of the first measurement value relative to the third measurement value and the increasing/decreasing trend of the first performance value relative to the third performance value meet the preset change trend, the control apparatus determines that the first working data meets the trend of the first set.

In one example, the preset change trend is the change consistency trend. When a change of the first measurement value in the first working data relative to the third measurement value in the third working data is increasing, and a change of the first performance value in the first working data relative to the third performance value in the third working data is increasing, or when a change of the first measurement value in the first working data relative to the third measurement value in the third working data is decreasing, and a change of the first performance value in the first working data relative to the third performance value in the third working data is decreasing, it indicates that the first working data meets the trend of the first set.

In another example, the preset change trend is the change contrary trend. When a change of the first measurement value in the first working data relative to the third measurement value in the third working data is increasing, and a change of the first performance value in the first working data relative to the third performance value in the third working data is decreasing, or when a change of the first measurement value in the first working data relative to the third measurement value in the third working data is decreasing, and a change of the first performance value in the first working data relative to the third performance value in the third working data is increasing, it indicates that the first working data meets the trend of the first set.

In a possible implementation, when the third measurement value is equal to the first measurement value, the control apparatus may further determine whether the first performance value meets a second preset threshold. If the first performance value meets the second preset threshold, the control apparatus determines whether the first working data meets the trend of the first set. The second preset threshold is determined based on an actual working condition of the network device.

In a possible implementation, when the network device runs in a stable working condition, a change of the performance value corresponding to the network device is also stable in a specific range. To improve working efficiency of the control apparatus, before determining whether the first working data meets the trend of the first set, the control apparatus may further first determine whether the first performance value in the first working data meets the second preset threshold. When the first performance value meets the second preset threshold, the control apparatus further determines whether the first working data meets the trend of the first set. In other words, when the collected first measurement value does not meet the second preset threshold, the control apparatus can directly discard the working data without performing a sequent determining operation, thereby improving working efficiency.

In a possible implementation, when a hardware configuration of the network device changes, working data corresponding to the network device greatly changes. To enable working data in a same hardware configuration to be placed in a same set, before the control apparatus determines whether the first working data meets the trend of the first set, the control apparatus may further determine whether a current device parameter of the network device is consistent with a device parameter corresponding to the first set. When the current device parameter of the network device is consistent with the device parameter corresponding to the first set, the control apparatus performs subsequent determining. When the current device parameter of the network device is inconsistent with the device parameter corresponding to the first set, the control apparatus obtains a third set, where the third set includes the first working data.

It should be noted that when the control apparatus determines whether the first working data meets the trend of the first set, the first working data does not need to strictly meet the trend of the first set, and a specific fluctuation is allowed. A specific fluctuation range may be determined based on indicators such as an actual working condition and a device parameter. For example, the measurement value is an ambient temperature, the performance value is a bit error rate, a first ambient temperature is 15.4°, a first bit error rate is 4, a third ambient temperature is 15°, and a third bit error rate is 4.1. The first ambient temperature increases relative to the third ambient temperature, and based on the trend of the first set, the first bit error rate increases relative to the third bit error rate. However, a fluctuation between the first ambient temperature and the third ambient temperature is relatively small, and a fluctuation between the first bit error rate and the third bit error rate is also relatively small. In this case, it may be determined that the first working data meets the trend of the first set.

S103. In response to that the first working data meets the trend of the first set, the control apparatus adds the first working data to the first set.

When it is determined that the first working data meets the trend of the first set, it indicates that the first working data is valid working data. In this case, the control apparatus adds the first working data to the first set, to update the first set, so that the first set can include working data in more working conditions.

In a possible implementation, when the first measurement value is equal to a measurement value in a group of working data in the first set, the control apparatus may calculate an average value of the first performance value and a performance value in the group of working data to obtain an average performance value, and calculate an average value of the first device running parameter and a device running parameter in the group of working data to obtain an average device running parameter. The control apparatus may delete a group of working data whose measurement value is the first measurement value, and add, to the first set, a group of working data that includes the first measurement value, the average performance value, and the average device running parameter.

When the first working data does not meet the trend of the first set, the control apparatus may discard the first working data, and continue to collect working data.

S104. The control apparatus determines second working data based on a current measurement value, and controls, based on a second device running parameter in the second working data, the network device to run.

In some embodiments, when the control apparatus detects that a current working condition of the network device changes or the network device needs to be restarted, the control apparatus may determine the second working data based on the current measurement value, and control, based on the second device running parameter in the second working data, the network device to run, so that the network device can work based on the second device running parameter, thereby ensuring that transmission quality of the network device reaches a second performance value. The current measurement value indicates a working condition currently corresponding to the network device, and the second working data includes a second measurement value, the second performance value, and the second device running parameter. The second measurement value indicates a working condition corresponding to the network device in a working process, and the second measurement value is equal to the current measurement value or the second measurement value is close to the current measurement value. The second performance value indicates data transmission quality of the network device in the condition indicated by the second measurement value. The second device running parameter indicates a corresponding running parameter when data transmission quality of the network device is the second performance value.

The second working data may be obtained in the following two manners:

In one manner, the control apparatus searches the first set or a second set for the matched second working data based on the current measurement value. To be specific, the control apparatus searches, based on the current measurement value, the first set or the second set for a target measurement value that is equal to or close to the current measurement value. Working data corresponding to the target measurement value is the second working data. The second set is obtained by the control apparatus from the first set through sampling based on the sampling parameter, and the second set includes the second working data.

Specifically, before determining the second working data, the control apparatus may extract a plurality of groups of working data from the first set based on the sampling parameter, to generate the second set. The sampling parameter is a sampling step corresponding to a measurement value. For example, if the measurement value is an ambient temperature, the sampling parameter may be a sampling step of 2°, and the measurement values respectively corresponding to the plurality of groups of working data in the first set are respectively 15°, 15.9°, 16.5°, 17°, 17.3° . . . . In this case, the control apparatus first extracts, from the first set, a group of working data corresponding to 15°, and then extract, based on the step of 2°, a group of working data corresponding to 17° and a group of working data corresponding to 19°, and sequentially performs extraction, to obtain the second set. In an actual extraction process, a group of working data corresponding to the sampling parameter may not exist in the first set. For example, the group of working data corresponding to the 19° needs to be extracted, but only a group of working data corresponding to 19.2° exists in the first set. The control apparatus may directly add, to the second set, the group of working data corresponding to the 19.2°; or the control apparatus obtains the group of working data corresponding to 19.2°, replaces an ambient temperature in the group of working data with 19°, and then adds the group of working data to the second set.

The sampling parameter may be set based on an actual collection situation, or the sampling parameter may be adjusted based on working data included in the first set. To enable the second set to include, as far as possible, device running parameters corresponding to various working conditions, the control apparatus may further adjust the sampling parameter based on a change range of the performance value in the first set. An example adjustment manner is as follows:

(1) The control apparatus obtains the fourth working data and the fifth working data from the first set.

The fourth working data includes a fourth measurement value, a fourth performance value, and a fourth device running parameter. The fourth measurement value indicates a working condition corresponding to the network device in a working process, the fourth performance value indicates data transmission quality of the network device in the working condition indicated by the fourth measurement value, and the fourth device running parameter indicates a corresponding running parameter when data transmission quality of the network device is the fourth performance value. The fifth working data includes a fifth measurement value, a fifth performance value, and a fifth device running parameter. The fifth measurement value indicates a working condition corresponding to the network device in a working process, the fifth performance value indicates data transmission quality of the network device in the working condition indicated by the fifth measurement value, and the fifth device running parameter indicates a corresponding running parameter when data transmission quality of the network device is the fifth performance value. The fourth measurement value is the minimum measurement value in the first set, and the fifth measurement value is the maximum measurement value in the first set.

(2) The control apparatus determines whether the difference between the fourth performance value and the fifth performance value is greater than a first preset threshold.

(3) In response to that the difference between the fourth performance value and the fifth performance value is greater than the first preset threshold, the control apparatus adjusts the sampling parameter based on the difference.

After determining the fourth performance value and the fifth performance value, the control apparatus determines whether the difference between the fourth performance value and the fifth performance value is greater than the first preset threshold. If the difference is not greater than the first preset threshold, it indicates that a fluctuation of the performance value in the first set is relatively small, and a working condition of the network device is relatively stable. Alternatively, if the value is greater than the first preset threshold, it indicates that a fluctuation of the performance value in the first set is relatively large. To ensure diversity of working data in the second set, the sampling parameter is adjusted to extract more working data from the first set. Based on this, the control apparatus may adjust the sampling parameter based on the difference between the fourth performance value and the fifth performance value. Specifically, when the difference is relatively large, the control apparatus may reduce the sampling step to increase an extraction quantity. A correspondence between a difference and a sampling parameter may be pre-configured. After determining the difference between the fourth performance value and the fifth performance value, the control apparatus may determine a matched sampling parameter based on the difference and the correspondence between a difference and a sampling parameter, and further obtain the second set from the first set through sampling by using the sampling parameter.

In the other manner, the control apparatus inputs the current measurement value into a prediction model. The prediction model may be generated through training by using the first set or a second set, and the prediction model is used to predict, based on the current measurement value, the second working data that matches the current measurement value. The control apparatus obtains the second working data that is output by the prediction model.

In this implementation, after obtaining the first set or the second set, the control apparatus may train an initial model by using the working data in the first set or the second set, so that the initial model can learn a relationship between a measurement value, a performance value, and a device running parameter that are in the working data, to generate the prediction model through training. The prediction model may be neural network models of various types, for example, a deep neural network (DNN) model, a recurrent neural network (RNN) model, and a convolutional neural network (CNN) model.

It can be learned from the solution provided in the embodiments of this application that, to enable the network device to quickly enter a stable working state, the control apparatus may determine a matched device running parameter based on a current measurement value, and control, by using the device running parameter, the network device to run, so that not only data transmission quality of the network device can be ensured, but also the network device does not need to perform adaptive learning on the device running parameter to quickly enter a stable state.

In actual application, when the network device includes a large quantity of transceivers and all the transceivers are simultaneously started, power consumption of a chip instantaneously increases by up to hundreds of watts, which causes a chip junction temperature to rise rapidly, for example, rise more than 10° per second. To match a current chip junction temperature, the network device needs to perform adaptive learning on the device running parameter, and the learning process is relatively slow, which affects data transmission quality of the network device. Based on this, an embodiment of this application provides a control method, which is described with reference to the accompanying drawings.

Figure 2:
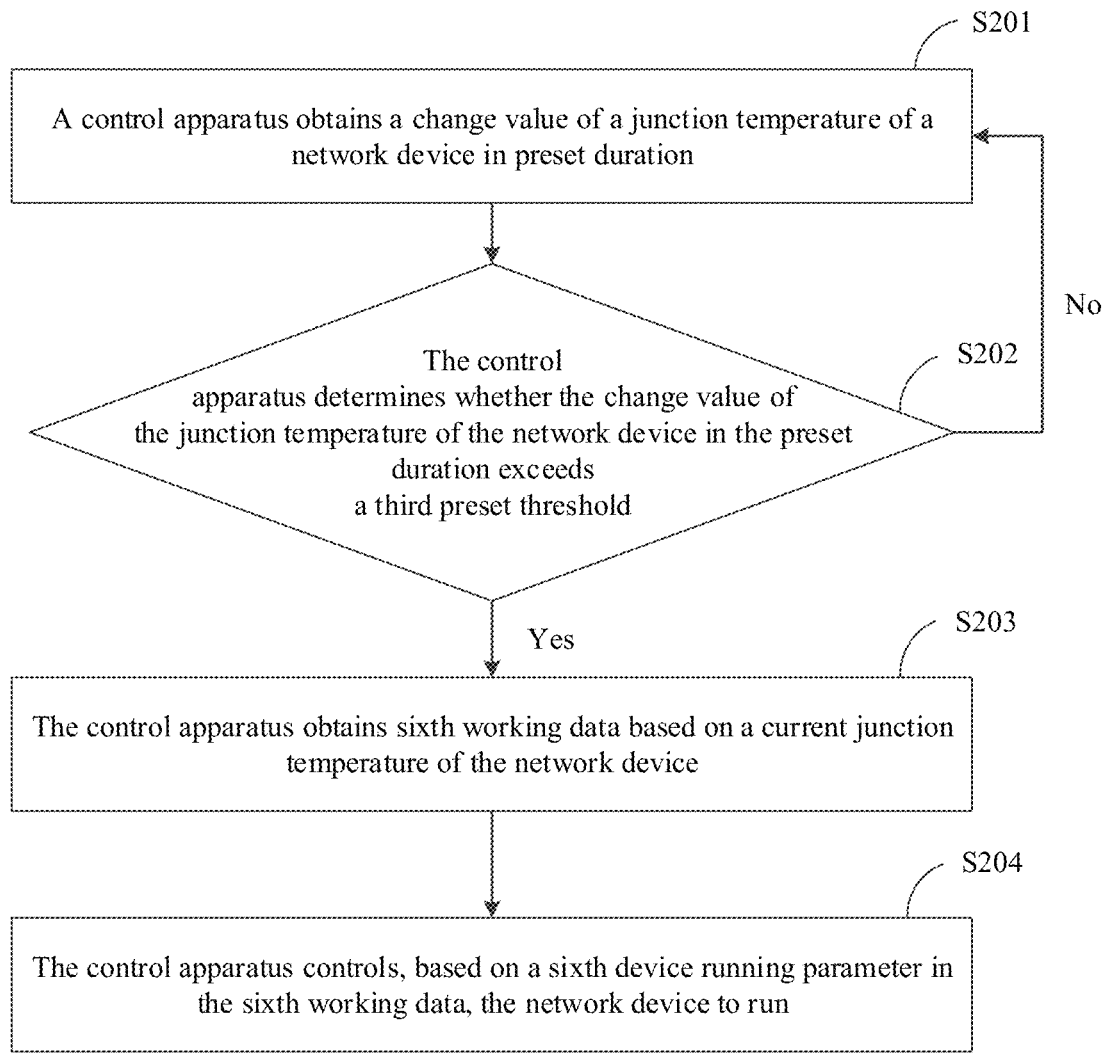
FIG. 2 is a flowchart of another network device control method according to an embodiment of this application.

FIG. 2 is a flowchart of another network device control method according to an embodiment of this application. As shown in FIG. 2, the method may include the following steps.

S201. A control apparatus obtains a change value of a junction temperature of a network device in preset duration.

S202. The control apparatus determines whether the change value of the junction temperature exceeds a third preset threshold.

In some embodiments, the control apparatus may periodically collect the junction temperature of the network device based on preset duration, and determine whether a change value of the junction temperature of the network device in a period exceeds the third preset threshold. If the change value does not exceed the third preset threshold, it indicates that the junction temperature of the network device does not change rapidly, and the network device is in a stable running state. Alternatively, if the change value exceeds the third preset threshold, it indicates that the junction temperature of the network device changes rapidly. To ensure that the network device run stably, the control apparatus may adjust a device running parameter of the network device, so that the network device can work based on an adjusted device running parameter, thereby ensuring data transmission quality. The third preset threshold may be determined based on an actual working condition of the network device.

S203. In response to that the change value of the junction temperature of the network device in the preset duration exceeds the third preset threshold, the control apparatus obtains sixth working data based on a current junction temperature of the network device.

When the control apparatus determines that the change value of the junction temperature of the network device in the preset duration exceeds the third preset threshold, the control apparatus obtains the sixth working data based on the current junction temperature of the network device. The sixth working data includes a sixth measurement value, a sixth performance value, and a sixth device running parameter. The sixth measurement value indicates a working condition corresponding to the network device in a working process, and the working condition includes the junction temperature. The sixth performance value indicates data transmission quality of the network device in the working condition indicated by the sixth measurement value. The sixth device running parameter indicates a corresponding running parameter when data transmission quality of the network device is the sixth performance value.

The control apparatus may search a first set or a second set for the matched sixth working data based on the current junction temperature, or the control apparatus inputs the current junction temperature into a prediction model, and the prediction model outputs the sixth working data that matches the current junction temperature. For obtaining of the sixth working data, refer to related descriptions of obtaining of the second working data. Details are not described herein again.

When the change value of the junction temperature of the network device in the preset duration does not exceed the third preset threshold, the control apparatus may continue to monitor a change of the junction temperature of the network device.

S204. The control apparatus controls, by using the sixth device running parameter in the sixth working data, the network device to run.

After the control apparatus determines the sixth working data, the control apparatus may control, by using the sixth device running parameter, the network device to run, so that the network device can quickly enter a stable working state and does not need to perform adaptive learning, thereby improving working efficiency and transmission quality of the network device.

In an implementation, to cover a wider chip junction temperature range, the control apparatus may further control, based on the current junction temperature, a heat dissipation device to run in different working modes, so that a heat dissipation efficiency of the heat dissipation device can match the current junction temperature. Specifically, when determining that the change value of the junction temperature in the preset duration exceeds the third preset threshold, the control apparatus may control the heat dissipation device to run in a first working mode. The heat dissipation efficiency of the heat dissipation device in the first working mode is greater than the preset heat dissipation efficiency.

As a communication bandwidth increases, the network device has an increasingly large quantity of transceivers, up to hundreds of transceivers. In a conventional transceiver startup solution, transceivers are sequentially started in serial, and a time for starting all the transceivers is up to hundreds of milliseconds, even several seconds. When all transceivers included in the network device are started in parallel, relatively large power ripple noise is generated, which affects transceiver stability. To implement that all the transceivers can be started in milliseconds, an embodiment of this application provides a parallel startup solution. In the implementation solution, a plurality of transceivers included in the network device may be divided into at least two groups, each group of transceivers may include a quantity of transceivers, and the groups of transceivers may be powered by different power supplies. For example, the transceiver in a first group is powered by a first power supply, and the transceiver in a second group is powered by a second power supply. Descriptions are provided below with reference to the accompanying drawings.

Figure 3:
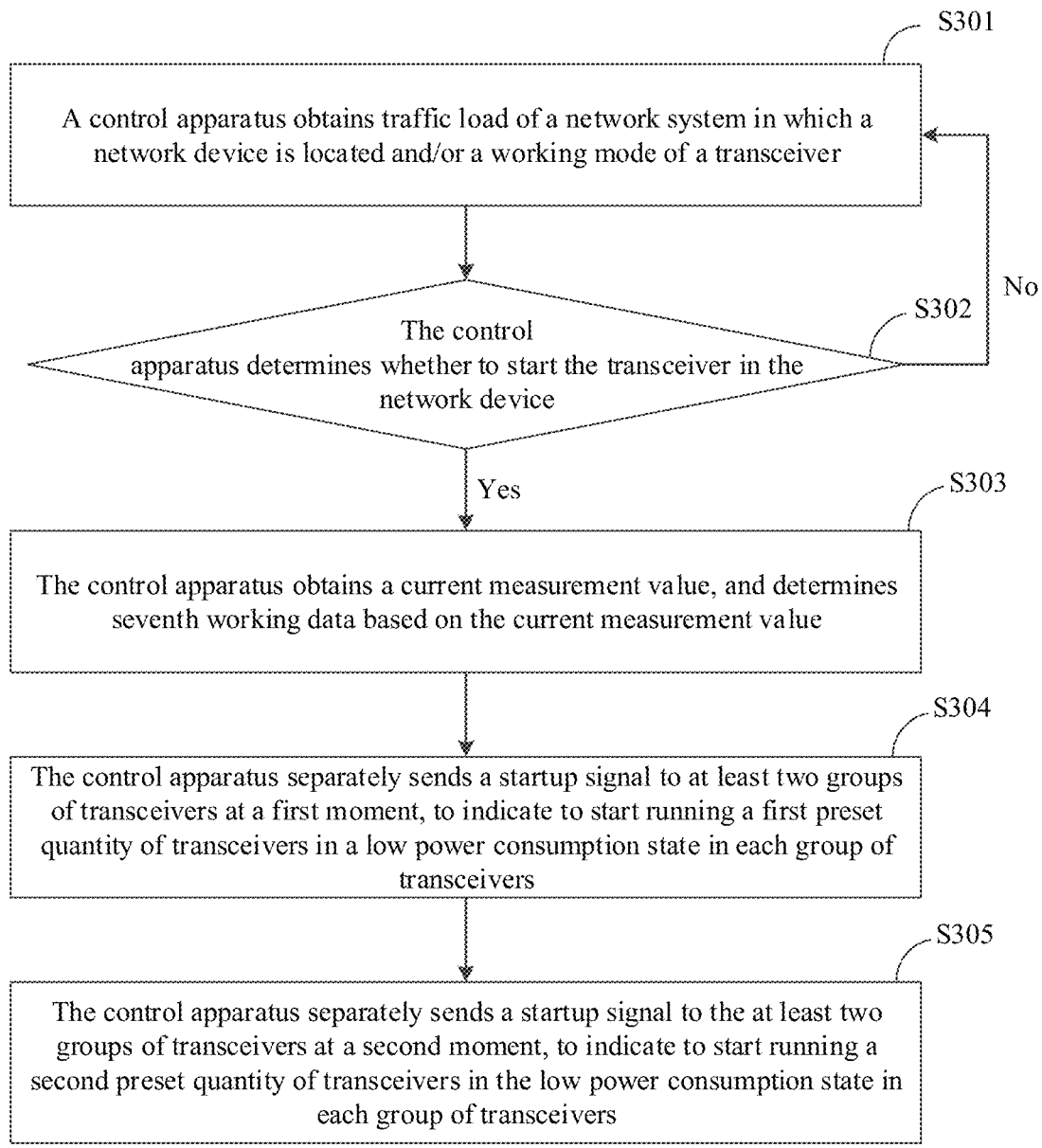
FIG. 3 is a flowchart of another network device control method according to an embodiment of this application.

FIG. 3 is a flowchart of still another network device control method according to an embodiment of this application. As shown in FIG. 3, the method may include the following steps.

S301. A control apparatus obtains a traffic load of a network system in which a network device is located and/or a working mode of a transceiver.

S302. The control apparatus determines, based on the traffic load and/or the working mode of the transceiver, whether to start the transceiver in the network device.

In some embodiments, when the transceiver in the network device is in a low power consumption state, the control apparatus may determine, based on current network load or a change of an active/standby mode of the transceiver, whether to start the transceiver in the network device. Specifically, when the network traffic exceeds a preset traffic threshold, to implement load sharing, the control apparatus may start the transceiver in the network device, so that the transceiver enters a working state to transmit traffic. Alternatively, when the control apparatus detects that the transceiver in the network device is converted from the standby state to the active state, the control apparatus may start the transceiver in the network device, so that the transceiver can be configured to transmit traffic, thereby ensuring ensure normal service transmission. The network device includes a plurality of transceivers.

S303. In response to starting the transceiver in the network device, the control apparatus obtains a current measurement value, and determines seventh working data based on the current measurement value.

When the control apparatus determines that the transceiver in the network device needs to be started, the control apparatus may obtain the current measurement value, and determine the seventh working data based on the current measurement value. The current measurement value indicates a working condition currently corresponding to the network device. The seventh working data includes a seventh measurement value, a seventh performance value, and a seventh device running parameter. The control apparatus may search a first set or a second set for the matched seventh working data based on the current measurement value, or the control apparatus inputs the current measurement value into a prediction model, to obtain the seventh working data that is output by the prediction model. For exemplary implementation of obtaining the seventh working data by the control apparatus, refer to related descriptions of obtaining the second working data in the embodiment shown in FIG. 1.

S304. The control apparatus separately sends a startup signal to at least two groups of transceivers at a first moment, where the startup signal includes the seventh working data, and the startup signal is used to indicate to start running a first preset quantity of transceivers in the low power consumption state in each group of transceivers based on the seventh device running parameter in the seventh working data.

In some embodiments, when the control apparatus determines that the transceiver in each group needs to be started, the control apparatus separately sends the startup signal to each group at the first moment, so that the preset quantity of transceivers in the low power consumption state in each group are powered on to run. In other words, transceivers in a plurality of groups are started in parallel. Because the groups of transceivers are powered by different power supplies, at the first moment, each power supply can supply power to only the transceiver that needs to be started, thereby reducing power corrugation noise. For example, a first group of transceivers includes 10 transceivers, which are all in the low power consumption state, and the second group of transceivers includes five transceivers, which are all in the low power consumption state. At the first moment, two transceivers in the first group are simultaneously started, and one transceiver in the second group is started.

S305. The control apparatus separately sends a startup signal to the at least two groups of transceivers at a second moment, to indicate to start running a second preset quantity of transceivers in the low power consumption state in each group of transceivers based on the seventh device running parameter, where there is an interval of preset duration between the first moment and the second moment.

To avoid relatively large power ripple noise generated when all transceivers in the network device are started at a same moment, the control apparatus may send the startup signal to each group of transceivers again at the second moment after an interval of the preset duration, so that the preset quantity of transceivers in the low power consumption state in each group of transceivers are powered on to run. The first preset quantity and the second preset quantity may be the same or different. For example, a first group of transceivers includes 10 transceivers, which are all in the low power consumption state, and the second group of transceivers includes five transceivers, which are all in the low power consumption state. At the first moment, a first transceiver and second transceiver in the first group are simultaneously started, and a first transceiver in the second group is started. At the second moment, a third transceiver and a fourth transceiver in the first group are simultaneously started, and a second transceiver in the second group is started. The preset duration is usually several milliseconds.

It can be learned based on the foregoing embodiment that the first set includes a plurality of groups of working data, and each group of working data meets a change trend of the first set. The first set may be obtained in two manners. In one manner, working data of the network device in different working conditions is collected through online learning. In the other manner, working data of the network device in different working conditions is obtained in through offline learning. The online learning means that the control apparatus collects each piece of working data in an actual working process of the network device, and the offline learning means that various different working conditions are simulated to obtain working data in the different working conditions.

When the first set is obtained through online learning, the control apparatus may obtain, based on a collection period, working data corresponding to different collection moments.

In one example, for working data corresponding to a first collection moment, the control apparatus may directly add the working data to the first set.

For working data corresponding to a second collection moment, the control apparatus determines whether an increasing/decreasing trend of a performance value in the current working data relative to a performance value in the working data corresponding to the first collection moment and an increasing/decreasing trend of a measurement value in the current working data relative to a measurement value in the working data corresponding to the first collection moment meet a preset change trend. If the increasing/decreasing trends meet the preset change trend, the control apparatus adds, to the first set, the working data corresponding to the second collection moment.

For working data corresponding to a third collection moment, the control apparatus determines target working data from the first set, where the difference between a measurement value in the working data corresponding to the third collection moment and a measurement value in the target working data is minimum. The control apparatus determines whether an increasing/decreasing trend of a performance value in the current working data relative to a performance value in the target working data and an increasing/decreasing trend of a measurement value in the current working data relative to a measurement value in the target working data meet a preset change trend. If the increasing/decreasing trends meet the preset change trend, the control apparatus adds, to the first set, the working data corresponding to the third collection moment.

For working data corresponding to an $i^{th}$ collection moment, the control apparatus determines target working data from the first set, where the difference between a measurement value in the working data corresponding to the $i^{th}$ collection moment and a measurement value in the target working data is minimum. The control apparatus determines whether an increasing/decreasing trend of a performance value in the current working data relative to a performance value in the target working data and an increasing/decreasing trend of a measurement value in the current working data relative to a measurement value in the target working data meet a preset change trend. If the increasing/decreasing trends meet the preset change trend, the control apparatus adds, to the first set, the working data corresponding to the $i^{th}$ collection moment.

Collection is sequentially performed until the first set is obtained after a collection task lasting for one or more weeks is completed.

In another example, when collecting a group of working data, the control apparatus may determine only whether a performance value in the group of working data meets a second preset threshold. If the performance value meets the second preset threshold, the control apparatus adds the group of working data to the first set, to obtain the first set.

The first set is obtained in an offline manner. In the implementation, a user simulates various different working conditions, and the network device runs in the different working conditions. The control apparatus obtains working data in the different working conditions, to obtain an initial set. The initial set includes a plurality of groups of working data, and each group of working data includes a measurement value, a performance value, and a device running parameter. The control apparatus determines whether the performance value in each group of working data meets the second preset threshold. If the performance value does not meet the second preset threshold, the control apparatus deletes the group of working data from the initial set, to obtain the first set.

Based on the foregoing method embodiments, an embodiment of this application provides a control apparatus, which is described below with reference to the accompanying drawings.

Figure 4:
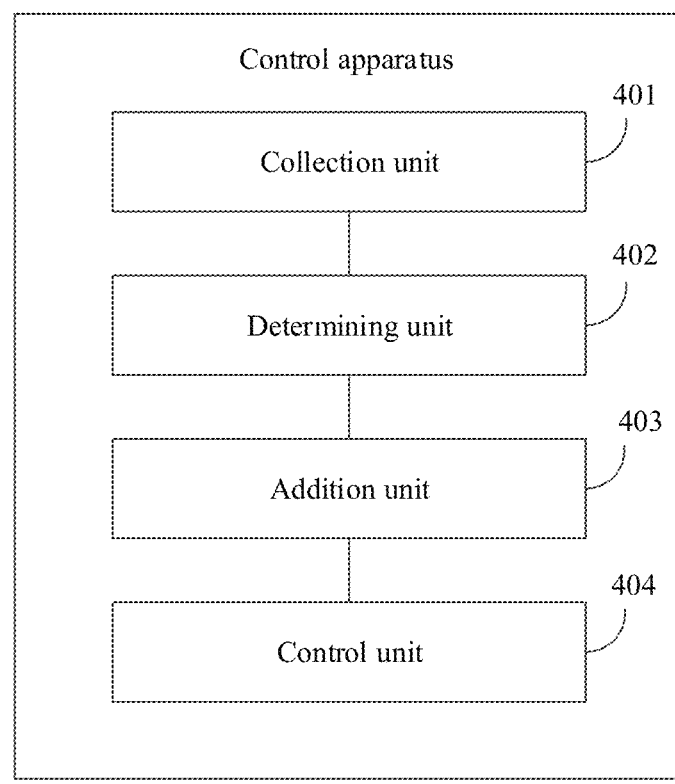
FIG. 4 is a structural diagram of a network device control apparatus according to an embodiment of this application.

FIG. 4 is a structural diagram of a network device control apparatus according to an embodiment of this application. As shown in FIG. 4, the apparatus corresponds to the control apparatus in the foregoing method embodiment. The apparatus 400 may include a collection unit 401, a determining unit 402, an addition unit 403, and a control unit 404.

The collection unit 401 is configured to collect first working data. The first working data includes a first measurement value, a first performance value, and a first device running parameter, the first measurement value indicates a working condition corresponding to a network device in a working process, the first performance value indicates data transmission quality of the network device in the working condition indicated by the first measurement value, and the first device running parameter indicates a corresponding running parameter when data transmission quality of the network device is the first performance value. For implementation of the collection unit 401, refer to related descriptions in S101 in the embodiment shown in FIG. 1.

The determining unit 402 is configured to determine whether the first working data meets a trend of a first set, where the first set includes a plurality of groups of working data, and an increasing/decreasing trend of measurement values in the plurality of groups of working data is consistent with an increasing/decreasing trend of performance values in the plurality of groups of working data, or an increasing/decreasing trend of measurement values in the plurality of groups of working data is contrary to an increasing/decreasing trend of performance values in the plurality of groups of working data. For implementation of the determining unit 402, refer to related descriptions in S102 in the embodiment shown in FIG. 1.

The addition unit 403 is configured to add the first working data to the first set in response to that the first working data meets the trend of the first set. For implementation of the addition unit 403, refer to related descriptions in S103 in the embodiment shown in FIG. 1. The determining unit 402 is further configured to determine second working data based on a current measurement value. For implementation of determining the second working data by the determining unit 402, refer to related descriptions in S104 in the embodiment shown in FIG. 1.

The control unit 404 is configured to control, based on a second device running parameter in the second working data, the network device to run. The current measurement value indicates a working condition currently corresponding to the network device, the second working data includes a second measurement value, a second performance value, and the second device running parameter, and the first set includes the second working data or the second working data is associated with the first set. For implementation of the control unit 404, refer to related descriptions in S104 in the embodiment shown in FIG. 1.

In an implementation, the determining unit 402 is configured to: obtain third working data from the first set, where the third working data includes a third measurement value, a third performance value, and a third device running parameter, and the difference between the first measurement value and the third measurement value is not greater than the difference between the first measurement value and any other measurement value in the first set; determine whether an increasing/decreasing trend of the first measurement value relative to the third measurement value and an increasing/decreasing trend of the first performance value relative to the third performance value meet a preset change trend, where the preset change trend is a change consistency trend or a change contrary trend; and in response to that the increasing/decreasing trend of the first measurement value relative to the third measurement value and the increasing/decreasing trend of the first performance value relative to the third performance value meet the preset change trend, determine that the first working data meets the trend of the first set. For exemplary implementation in which the determining unit 402 determines whether the first working data meets the trend of the first set, refer to related descriptions in S102.

In an implementation, the determining unit 402 is configured to sort the plurality of groups of working data in the first set based on the measurement values in the plurality of groups of working data. For exemplary implementation in which the determining unit 402 determines whether the first working data meets the trend of the first set, refer to related descriptions in S102.

In an implementation, the apparatus further includes an obtaining unit (not shown in FIG. 4).

The obtaining unit is configured to obtain a second set based on the first set before the determining unit determines the second working data based on the current measurement value. The second set is obtained from the first set through sampling based on a sampling parameter, and the second set includes the second working data. For exemplary implementation of the obtaining unit, refer to related descriptions of obtaining the second set in S104.

In an implementation, the determining unit 402 is configured to search the first set or the second set for the matched second working data based on the current measurement value. For implementation of obtaining the second working data by the determining unit 402, refer to related descriptions of obtaining the second working data in S104.

In an implementation, the determining unit 402 is configured to: input the current measurement value into a prediction model, where the prediction model is generated through training by using the first set or the second set, and the prediction model is used to predict, based on the current measurement value, the second working data that matches the current measurement value; and obtain the second working data that is output by the prediction model. For implementation of obtaining the second working data by the determining unit 402, refer to related descriptions of obtaining the second working data in S104.

In an implementation, the apparatus further includes an obtaining unit and an adjustment unit (not shown in the figure).

The obtaining unit is configured to obtain fourth working data and fifth working data from the first set. The fourth working data includes a fourth measurement value, a fourth performance value, and a fourth device running parameter, the fifth working data includes a fifth measurement value, a fifth performance value, and a fifth device running parameter, the fourth measurement value is the minimum measurement value in the first set, and the fifth measurement value is the maximum measurement value in the first set. For exemplary implementation of the obtaining unit, refer to related descriptions in S104.

The determining unit 402 is further configured to determine whether the difference between the fourth performance value and the fifth performance value is greater than a first preset threshold. For exemplary implementation of the determining unit 402, refer to related descriptions in S104.

The adjustment unit is further configured to adjust the sampling parameter based on the difference in response to that the difference between the fourth performance value and the fifth performance value is greater than the first preset threshold. For exemplary implementation of the adjustment unit, refer to related descriptions in S104.

In an implementation, the determining unit 402 is further configured to: before determining whether the first working data meets the trend of the first set, determine whether the first performance value meets a second preset threshold; and in response to that the first performance value meets the second preset threshold, determine whether the first working data meets the trend of the first set. For exemplary implementation of the determining unit 402, refer to related descriptions in S103.

In an implementation, the determining unit 402 is further configured to: determine whether a change value of a junction temperature of the network device in preset duration exceeds a third preset threshold, where the junction temperature is a measurement value; and in response to that the change value of the junction temperature in the preset duration exceeds the third preset threshold, obtain sixth working data based on a current junction temperature of the network device, and control, by using a sixth device running parameter in the sixth working data, the network device to run, where the sixth working data includes a sixth measurement value, a sixth performance value, and the sixth device running parameter, the sixth measurement value includes the junction temperature, and the first set includes the sixth working data or the sixth working data is associated with the first set. For exemplary implementation of the determining unit 402, refer to related descriptions in S201 to S204.

In an implementation, the control unit 404 is further configured to control a heat dissipation device to run in a first working mode. The heat dissipation efficiency of the heat dissipation device in the first working mode is greater than the preset heat dissipation efficiency. For exemplary implementation of the control unit 404, refer to related descriptions in S204.

In an implementation, the determining unit 402 is further configured to: before determining whether the first working data meets the trend of the first set, determine whether a device parameter of the network device is consistent with a device parameter corresponding to the first set; and obtain a third set in response to that the device parameter of the network device is inconsistent with the device parameter corresponding to the first set, where the third set includes the first working data. For exemplary implementation of the determining unit 402, refer to related descriptions in S102.

In an implementation, when the network device includes at least two groups of transceivers, each of the at least two groups of transceivers includes a plurality of transceivers, and each transceiver in the at least two groups of transceivers is in a low power consumption state, the apparatus further includes a sending unit (not shown in the figure).

The determining unit 402 is further configured to: determine whether to start the transceiver; and in response to starting the transceiver, obtain a current measurement value, and determine seventh working data based on the current measurement value. The seventh working data includes a seventh measurement value, a seventh performance value, and a seventh device running parameter, and the first set includes the seventh working data or the seventh working data is associated with the first set. For exemplary implementation of the determining unit 402, refer to related descriptions in S302 and S303.

The sending unit is configured to separately send a startup signal to the at least two groups of transceivers at a first moment. The startup signal includes the seventh working data, and the startup signal is used to indicate to start running a first preset quantity of transceivers in the low power consumption state in each group of transceivers based on the seventh device running parameter.

The sending unit is configured to separately send the startup signal to the at least two groups of transceivers at a second moment, to indicate to start running a second preset quantity of transceivers in the low power consumption state in each group of transceivers based on the seventh device running parameter. For implementation of the sending unit, refer to related descriptions in S304 and S305.

In an implementation, the determining unit 402 is further configured to: obtain a traffic load of a current network system and/or a working mode of the transceiver, where the working mode includes an active mode and a standby mode; and when the traffic load exceeds a preset traffic threshold and/or the transceiver is converted from the standby mode to the active mode, determine to start the transceiver. For implementation of the determining unit 402, refer to related descriptions in S301.

In an implementation, the measurement value is one or more of an ambient temperature, a junction temperature, or a working voltage.

In an implementation, the performance value includes a bit error rate and/or a signal-to-noise ratio.

In an implementation, the device running parameter includes chromatic dispersion compensation and/or polarization mode compensation.

Figure 5:
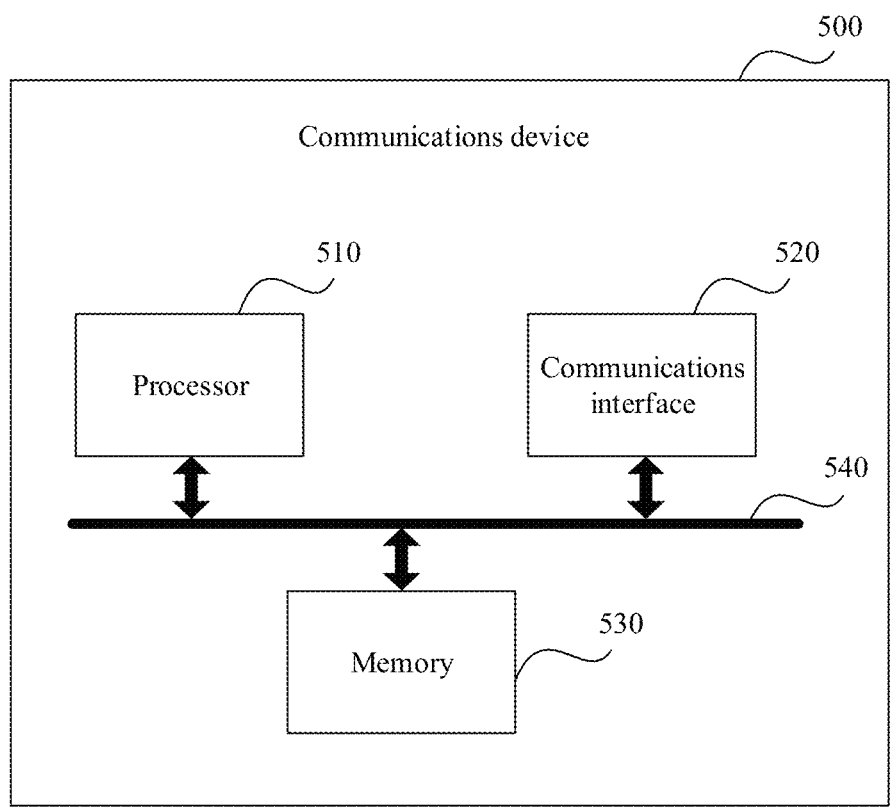
FIG. 5 is a structural diagram of a communications device according to an embodiment of this application.

FIG. 5 is a schematic structural diagram of a communications device according to an embodiment of this application. The communications device may be, for example, the control apparatus in the embodiments shown in FIG. 1 to FIG. 3, or may be implemented by the control apparatus 400 in the embodiment shown in FIG. 4.

Referring to FIG. 5, a communications device 500 includes a processor 510, a communications interface 520, and a memory 530. There may be one or more processors 510 in the communications device 500. In FIG. 5, one processor is used as an example. In some embodiments of this application, the processor 510, the communications interface 520, and the memory 530 may be connected by using a bus or in another manner. In FIG. 5, connection by using a bus 540 is used as an example.

The processor 510 may be a CPU, an NP, or a combination of a CPU and an NP. The processor 510 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The communications interface 520 is configured to receive and send a packet. Specifically, the communications interface 520 may include a receiving interface and a sending interface. The receiving interface may be configured to receive a packet, and the sending interface may be configured to send a packet. There may be one or more communications interfaces 520.

The memory 530 may include a volatile memory, such as a random access memory (RAM); or the memory 530 may include a non-volatile memory, such as a flash memory, a hard disk drive (HDD), or a solid-state drive (SSD); or the memory 530 may include a combination of the foregoing types of memories. The memory 530 may store, for example, the first set, the second set, and the third set that are mentioned above.

Optionally, the memory 530 stores an operating system and a program, an executable module or a data structure, a subset thereof, or an extension set thereof. The program may include various operation instructions for implementing various operations. The operating system may include various system programs for implementing various basic services and processing hardware-based tasks. The processor 510 may read the program in the memory 530, to implement the network device control method provided in the embodiments of this application.

The memory 530 may be a storage device in the communications device 500, or may be a storage apparatus independent of the communications device 500.

The bus 540 may be a peripheral component interconnect (PCI) bus, an extended industry standard architecture (EISA) bus, or the like. The bus 540 may be classified into an address bus, a data bus, a control bus, and the like. For ease of representation, only one thick line is used to represent the bus in FIG. 5, but this does not mean that there is only one bus or only one type of bus.

Figure 6:
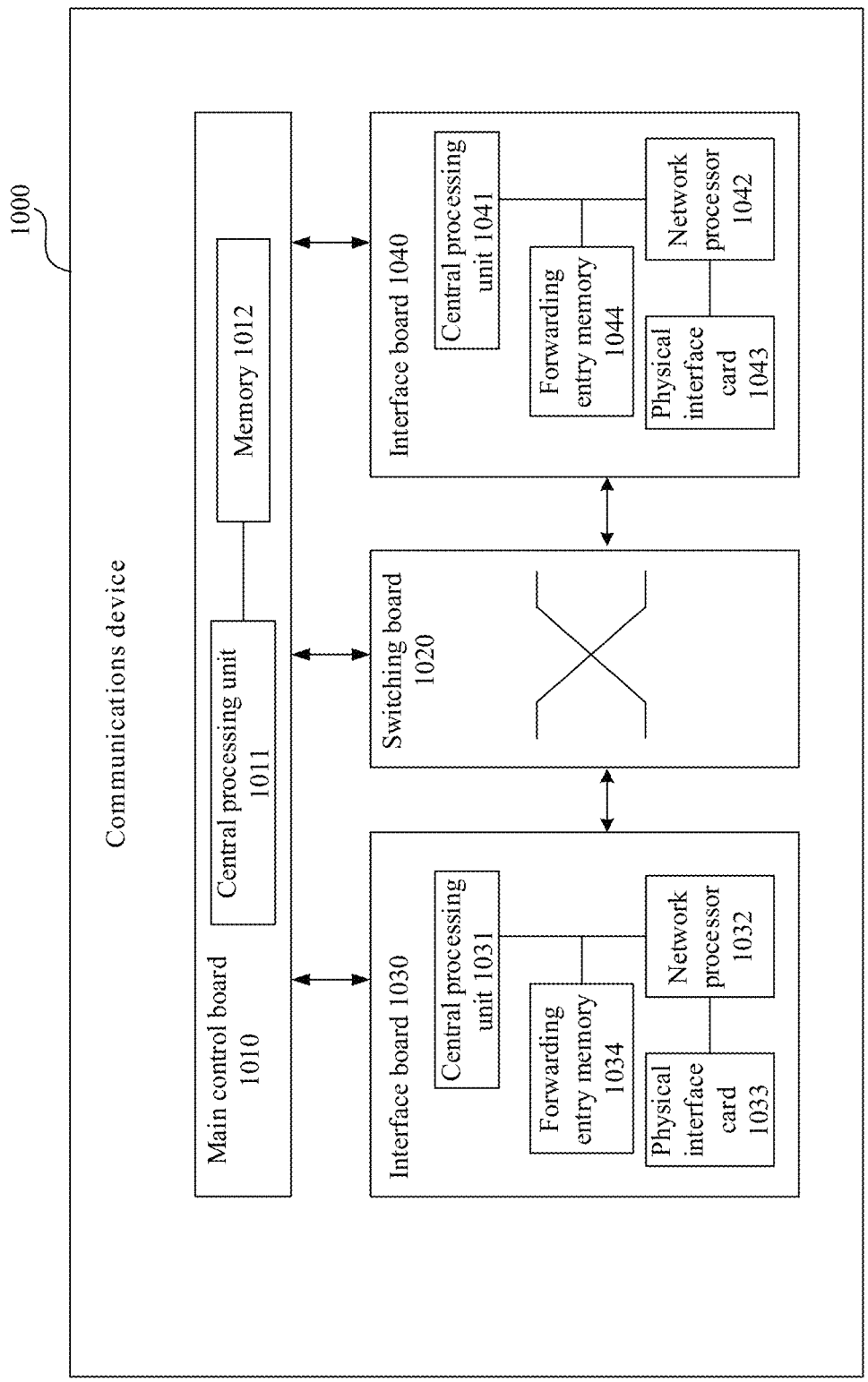
FIG. 6 is a structural diagram of another communications device according to an embodiment of this application.

FIG. 6 is a schematic structural diagram of another communications device according to an embodiment of this application. A communications device 1000 may be configured as the control apparatus in the foregoing embodiments, or may be implemented by the control apparatus 400 in the embodiment shown in FIG. 4.

The communications device 1000 includes a main control board 1010 and an interface board 1030.

The main control board 1010 is also referred to as a main processing unit or a route processing card. The main control board 1010 controls and manages components in the communications device 1000, including functions such as routing calculation, device management, device maintenance, and protocol processing. The main control board 1010 includes a central processing unit 1011 and a memory 1012.

The interface board 1030 is also referred to as a line processing unit (LPU), a line card, or a service board. The interface board 1030 is configured to provide various service interfaces and forward a data packet. The service interfaces include but are not limited to an Ethernet interface, a POS (Packet over SONET/SDH) interface, and the like. The Ethernet interface is, for example, a flexible Ethernet interface (FlexE Client). The interface board 1030 includes a central processing unit 1031, a network processor 1032, a forwarding entry memory 1034, and a physical interface card (PIC) 1033.

The central processing unit 1031 on the interface board 1030 is configured to control and manage the interface board 1030 and communicate with the central processing unit 1011 on the main control board 1010.

The network processor 1032 is configured to forward and process a packet. A form of the network processor 1032 may be a forwarding chip. Specifically, processing of an uplink packet includes processing at a packet ingress interface and forwarding table searching. Processing of a downlink packet includes forwarding table searching and the like.

The physical interface card 1033 is configured to implement a physical-layer interconnection function. Original traffic enters the interface board 1030 from the physical interface card 1033, and a processed packet is sent from the physical interface card 1033. The physical interface card 1033 includes at least one physical interface, and the physical interface is also referred to as a physical interface. The physical interface card 1033 corresponds to a FlexE physical interface 204 in a system architecture. The physical interface card 1033 is also referred to as a subcard and may be installed on the interface board 1030, and is responsible for converting an optoelectronic signal into a packet, performing validity check on the packet, and then forwarding the packet to the network processor 1032 for processing. In some embodiments, the central processing unit 1031 on the interface board 1030 may also perform a function of the network processor 1032, for example, implementing software forwarding based on a general-purpose CPU, so that the network processor 1032 is not required in the physical interface card 1033.

Optionally, the communications device 1000 includes a plurality of interface boards. For example, the communications device 1000 further includes an interface board 1040, and the interface board 1040 includes a central processing unit 1041, a network processor 1042, a forwarding entry memory 1044, and a physical interface card 1043.

Optionally, the communications device 1000 further includes a switching board 1020. The switching board 1020 may also be referred to as a switch fabric unit (SFU). When the communications device has a plurality of interface boards 1030, the switching board 1020 is configured to complete data exchange between the interface boards. For example, the interface board 1030 and the interface board 1040 may communicate with each other by using the switching board 1020.

The main control board 1010 is coupled to the interface board 1030. For example, the main control board 1010, the interface boards 1030 and 1040, and the switching board 1020 are connected to a system backplane through a system bus to communicate with each other. In a possible implementation, an inter-process communication (IPC) channel is established between the main control board 1010 and the interface board 1030, and the main control board 1010 and the interface board 1030 communicate with each other through the IPC channel.

Logically, the communications device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs the following functions: routing, generating a forwarding table, processing signaling and a protocol packet, configuring and maintaining a device status, or the like. The control plane delivers the generated forwarding table to the forwarding plane. On the forwarding plane, the network processor 1032 searches the forwarding table delivered by the control plane, and then forwards, based on the table, a packet received by the physical interface card 1033. The forwarding table delivered by the control plane may be stored in the forwarding entry memory 1034. In some embodiments, the control plane and the forwarding plane may be completely separated, and are not on a same device.

It should be understood that the sending unit and the like in the control apparatus 400 may be equivalent to the physical interface card 1033 or the physical interface card 1043 in the communications device 1000. The obtaining unit, the determining unit 402, and the like in the control apparatus 400 may be equivalent to the central processing unit 1011 or the central processing unit 1031 in the communications device 1000.

It should be understood that in some embodiments of this application, an operation on the interface board 1040 is the same as an operation on the interface board 1030. For brevity, details are not described again. It should be understood that the communications device 1000 may correspond to the first network device in the foregoing method embodiments. The main control board 1010, the interface board 1030, and/or the interface board 1040 in the communications device 1000 may implement functions of the control apparatus and/or steps implemented by the control apparatus in the foregoing method embodiments. For brevity, details are not described again.

It should be understood that there may be one or more main control boards. When there are a plurality of main control boards, the main control boards may include an active main control board and a backup main control board. There may be one or more interface boards. A stronger data processing capability of the communications device indicates a larger quantity of provided interface boards. There may also be one or more physical interface cards on the interface board. There may be no switching board or may be one or more switching boards. When there are a plurality of switching boards, the switching boards may jointly implement load sharing and redundancy backup. In a centralized forwarding architecture, the communications device may not need a switching board, and the interface board undertakes a service data processing function of an entire system. In a distributed forwarding architecture, the communications device may have at least one switching board, and data is exchanged between a plurality of interface boards by using the switching board, to provide a capability of exchanging and processing a large capacity of data. Therefore, a data access and processing capability of the communications device in the distributed architecture is greater than the device in the centralized architecture. Optionally, a form of the communications device may be that only one card, that is, there is no switching board, and functions of the interface board and the main control board are integrated on the card. In this case, the central processing unit on the interface board and the central processing unit on the main control board may be combined into one central processing unit on the card, to perform functions obtained after the two central processing units are superposed. A device in this form (for example, a communications device such as a low-end switch or router) has a relatively low data exchanging and processing capability. A specific architecture to be used depends on a specific networking deployment scenario.

In some possible embodiments, the control apparatus may be implemented as a virtualized device. For example, the virtualized device may be a virtual machine (VM) that runs a program having a packet sending function, and the virtual machine is deployed on a hardware device (for example, a physical server). The virtual machine is a complete computer system that is simulated by using software, has a complete hardware system function, and runs in a completely isolated environment. The virtual machine may be configured as the first network device. For example, the control apparatus may be implemented based on a general-purpose physical server and in combination with a network functions virtualization (NFV) technology. The control apparatus is a virtual host, a virtual router, or a virtual switch. By reading this application, persons skilled in the art may obtain, on the general-purpose physical server through virtualization with reference to the NFV technology, the control apparatus having the foregoing functions. Details are not described herein.

It should be understood that the foregoing communication devices in various product forms each have any function of the control apparatus in the foregoing method embodiments, and details are not described herein again.

An embodiment of this application further provides a chip, including a processor and an interface circuit. The interface circuit is configured to receive an instruction and transmit the instruction to the processor. The processor may be, for example, an example implementation form of the control apparatus 400 shown in FIG. 4, and may be configured to perform the foregoing network device control method. The processor is coupled to a memory. The memory is configured to store a program or instructions, and when the program or the instructions are executed by the processor, the chip system implements the method in any one of the foregoing method embodiments.

Optionally, there may be one or more processors in the chip system. The processor may be implemented by using hardware or software. When being implemented by using hardware, the processor may be a logic circuit, an integrated circuit, or the like. When being implemented by using software, the processor may be a general-purpose processor, and is implemented by reading software code stored in the memory.

Optionally, there may be one or more memories in the chip system. The memory may be integrated with the processor, or may be disposed separate from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not specifically limited in this application.

For example, the chip system may be a field-programmable gate array (FPGA), may be an application-specific integrated circuit (ASIC), may be a system on chip (SoC), may be a central processing unit (CPU), may be a network processor (NP), may be a digital signal processor (DSP), may be a micro controller unit (MCU), or may be a programmable logic device (PLD) or another integrated chip.

An embodiment of this application further provides a computer-readable storage medium, including instructions or a computer program. When the instructions or the computer program are/is run on a computer, the computer is enabled to perform the network device control method provided in the foregoing embodiment.

An embodiment of this application further provides a computer program product including instructions or a computer program. When the instructions or the computer program are/is run on a computer, the computer is enabled to perform the network device control method provided in the foregoing embodiment.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units expressly listed, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical service division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

Persons skilled in the art should be aware that in the foregoing one or more examples, services described in the present application may be implemented by hardware, software, firmware, or any combination thereof. When the services described in the present application are implemented by the software, these services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The foregoing example implementations provide detailed descriptions of objectives, technical solutions, and beneficial effects of the present application in detail. It should be understood that the foregoing are merely example implementations of the present application.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A network device control method, wherein the method comprises:
    collecting, by a control apparatus, first working data, wherein the first working data comprises a first measurement value, a first performance value comprising at least one of a first bit error rate or a first signal-to-noise ratio, and a first device running parameter, the first measurement value indicates a working condition corresponding to a network device in a working process, the first performance value indicates data transmission quality of the network device in the working condition indicated by the first measurement value, and the first device running parameter indicates a corresponding running parameter when data transmission quality of the network device is the first performance value;
    determining, by the control apparatus, whether the first working data meets a trend of a first set, wherein the first set comprises a plurality of groups of working data, and an increasing/decreasing trend of measurement values in the plurality of groups of working data is consistent with an increasing/decreasing trend of performance values in the plurality of groups of working data, or an increasing/decreasing trend of measurement values in the plurality of groups of working data is contrary to an increasing/decreasing trend of performance values in the plurality of groups of working data;
    adding, by the control apparatus, the first working data to the first set in response to that the first working data meets the trend of the first set; and
    determining, by the control apparatus, second working data based on a current measurement value, and controlling, based on a second device running parameter in the second working data, the network device to run, wherein the current measurement value indicates a working condition currently corresponding to the network device, the second working data comprises a second measurement value, a second performance value comprising at least one of a second bit error rate or a second signal-to-noise ratio, and the second device running parameter, and the first set comprises the second working data or the second working data is associated with the first set.

2. The method according to claim 1, wherein the determining, by the control apparatus, whether the first working data meets a trend of the first set comprises:
    obtaining, by the control apparatus, third working data from the first set, wherein the third working data comprises a third measurement value, a third performance value, and a third device running parameter, and a difference between the first measurement value and the third measurement value is not greater than a difference between the first measurement value and any other measurement value in the first set;

determining, by the control apparatus, whether an increasing/decreasing trend of the first measurement value relative to the third measurement value and an increasing/decreasing trend of the first performance value relative to the third performance value meet a preset change trend, wherein the preset change trend is a change consistency trend or a change contrary trend; and in response to that the increasing/decreasing trend of the first measurement value relative to the third measurement value and the increasing/decreasing trend of the first performance value relative to the third performance value meet the preset change trend, determining, by the control apparatus, that the first working data meets the trend of the first set.

3. The method according to claim 2, wherein before the obtaining, by the control apparatus, third working data from the first set, the method comprises:

sorting, by the control apparatus, the plurality of groups of working data in the first set based on the measurement values in the plurality of groups of working data.

4. The method according to claim 1, wherein before the determining, by the control apparatus, second working data based on a current measurement value, the method further comprises:

obtaining, by the control apparatus, a second set based on the first set, wherein the second set is obtained from the first set through sampling based on a sampling parameter, and the second set comprises the second working data.

5. The method according to claim 4, wherein the determining, by the control apparatus, second working data based on a current measurement value comprises:

searching, by the control apparatus, the first set or the second set for the matched second working data based on the current measurement value.

6. The method according to claim 4, wherein the determining, by the control apparatus, second working data based on a current measurement value comprises:

inputting, by the control apparatus, the current measurement value into a prediction model, wherein the prediction model is generated through training by using the first set or the second set, and the prediction model is used to predict, based on the current measurement value, the second working data that matches the current measurement value; and obtaining, by the control apparatus, the second working data that is output by the prediction model.

7. The method according to claim 4, wherein the method further comprises:

obtaining, by the control apparatus, fourth working data and fifth working data from the first set, wherein the fourth working data comprises a fourth measurement value, a fourth performance value, and a fourth device running parameter, the fifth working data comprises a fifth measurement value, a fifth performance value, and a fifth device running parameter, the fourth measurement value is a minimum measurement value in the first set, and the fifth measurement value is a maximum measurement value in the first set;

determining, by the control apparatus, whether a difference between the fourth performance value and the fifth performance value is greater than a first preset threshold; and adjusting, by the control apparatus, the sampling parameter based on the difference in response to that the difference between the fourth performance value and the fifth performance value is greater than the first preset threshold.

8. The method according to claim 1, wherein the method further comprises:

determining, by the control apparatus, whether a change value of a junction temperature of the network device in a preset duration exceeds a third preset threshold, wherein the junction temperature is a measurement value; and in response to that the change value of the junction temperature in the preset duration exceeds the third preset threshold, obtaining, by the control apparatus, sixth working data based on a current junction temperature of the network device, and controlling, by using a sixth device running parameter in the sixth working data, the network device to run, wherein the sixth working data comprises a sixth measurement value, a sixth performance value, and the sixth device running parameter, the sixth measurement value comprises the junction temperature, and the first set comprises the sixth working data or the sixth working data is associated with the first set.

9. The method according to claim 8, wherein the method further comprises:

controlling, by the control apparatus, a heat dissipation device to run in a first working mode, wherein a heat dissipation efficiency of the heat dissipation device in the first working mode is greater than a preset heat dissipation efficiency.

10. The method according to claim 1, wherein when the network device comprises at least two groups of transceivers, each of the at least two groups of transceivers comprises a plurality of transceivers, and each transceiver in the at least two groups of transceivers is in a low power consumption state, the method further comprises:

determining, by the control apparatus, whether to start the transceiver;

in response to starting the transceiver, obtaining, by the control apparatus, a current measurement value, and determining seventh working data based on the current measurement value, wherein the seventh working data comprises a seventh measurement value, a seventh performance value, and a seventh device running parameter, and the first set comprises the seventh working data or the seventh working data is associated with the first set;

separately sending, by the control apparatus, a startup signal to the at least two groups of transceivers at a first moment, wherein the startup signal comprises the seventh working data, and the startup signal is used to indicate to start running a first preset quantity of transceivers in the low power consumption state in each group of transceivers based on the seventh device running parameter; and separately sending, by the control apparatus, the startup signal to the at least two groups of transceivers at a second moment, to indicate to start running a second preset quantity of transceivers in the low power consumption state in each group of transceivers based on the seventh device running parameter.

11. The method according to claim 10, wherein the determining, by the control apparatus, whether to start the transceiver comprises:

obtaining, by the control apparatus, a traffic load of a current network system and/or a working mode of the transceiver, wherein the working mode comprises an active mode and a standby mode; and when the traffic load exceeds a preset traffic threshold and/or the transceiver is converted from the standby mode to the active mode, determining, by the control apparatus, to start the transceiver.

12. The method according to claim 1, before the determining, by the control apparatus, whether the first working data meets a trend of a first set, further comprising:

determining, by the control apparatus, whether the first performance value meets a second preset threshold; and in response to that the first performance value meets the second preset threshold, determining, by the control apparatus, whether the first working data meets the trend of the first set.

13. The method according to claim 1, wherein before the determining, by the control apparatus, whether the first working data meets a trend of a first set, the method further comprises:

determining, by the control apparatus, whether a device parameter of the network device is consistent with a device parameter corresponding to the first set; and obtaining, by the control apparatus, a third set in response to that the device parameter of the network device is inconsistent with the device parameter corresponding to the first set, wherein the third set comprises the first working data.

14. A network device control apparatus, comprising:

a memory storing instructions; and a processor coupled to the memory; wherein the instructions, when executed by the processor, cause the network device control apparatus to:

collect first working data, wherein the first working data comprises a first measurement value, a first performance value comprising at least one of a first bit error rate or a first signal-to-noise ratio, and a first device running parameter, the first measurement value indicates a working condition corresponding to a network device in a working process, the first performance value indicates data transmission quality of the network device in the working condition indicated by the first measurement value, and the first device running parameter indicates a corresponding running parameter when a data transmission quality of the network device is the first performance value;

determine whether the first working data meets a trend of a first set, wherein the first set comprises a plurality of groups of working data, and an increasing/decreasing trend of measurement values in the plurality of groups of working data is consistent with an increasing/decreasing trend of performance values in the plurality of groups of working data, or an increasing/decreasing trend of measurement values in the plurality of groups of working data is contrary to an increasing/decreasing trend of performance values in the plurality of groups of working data;

add the first working data to the first set in response to that the first working data meets the trend of the first set;

determine second working data based on a current measurement value; and control, based on a second device running parameter in the second working data, the network device to run, wherein the current measurement value indicates a working condition currently corresponding to the network device, the second working data comprises a second measurement value, a second performance value comprising at least one of a second bit error rate or a second signal-to-noise ratio, and the second device running parameter, and the first set comprises the second working data or the second working data is associated with the first set.

15. The network device control apparatus according to claim 14, wherein the instructions, when executed by the processor, further cause the network device control apparatus to: obtain third working data from the first set, wherein the third working data comprises a third measurement value, a third performance value, and a third device running parameter, and a difference between the first measurement value and the third measurement value is not greater than a difference between the first measurement value and any other measurement value in the first set; determine whether an increasing/decreasing trend of the first measurement value relative to the third measurement value and an increasing/decreasing trend of the first performance value relative to the third performance value meet a preset change trend, wherein the preset change trend is a change consistency trend or a change contrary trend; and in response to that the increasing/decreasing trend of the first measurement value relative to the third measurement value and the increasing/decreasing trend of the first performance value relative to the third performance value meet the preset change trend, determine that the first working data meets the trend of the first set.

16. The network device control apparatus according to claim 15, wherein the instructions, when executed by the processor, further cause the network device control apparatus to sort the plurality of groups of working data in the first set based on the measurement values in the plurality of groups of working data.

17. The network device control apparatus according to claim 14, wherein the instructions, when executed by the processor, further cause the network device control apparatus to:

obtain a second set based on the first set before the network device control apparatus determines the second working data based on the current measurement value, wherein the second set is obtained from the first set through sampling based on a sampling parameter, and the second set comprises the second working data.

18. The network device control apparatus according to claim 17, wherein the instructions, when executed by the processor, further cause the network device control apparatus to search the first set or the second set for the matched second working data based on the current measurement value.

19. The network device control apparatus according to claim 17, wherein the instructions, when executed by the processor, further cause the network device control apparatus to: input the current measurement value into a prediction model, wherein the prediction model is generated through training by using the first set or the second set, and the prediction model is used to predict, based on the current measurement value, the second working data that matches the current measurement value; and obtain the second working data that is output by the prediction model.

20. The network device control apparatus according to claim 17, wherein the instructions, when executed by the processor, further cause the network device control apparatus to:

obtain fourth working data and fifth working data from the first set, wherein the fourth working data comprises a fourth measurement value, a fourth performance value, and a fourth device running parameter, the fifth working data comprises a fifth measurement value, a fifth performance value, and a fifth device running parameter, the fourth measurement value is a minimum measurement value in the first set, and the fifth measurement value is a maximum measurement value in the first set;

determine whether a difference between the fourth performance value and the fifth performance value is greater than a first preset threshold; and adjust the sampling parameter based on the difference in response to that the difference between the fourth performance value and the fifth performance value is greater than the first preset threshold.

* * * * *